Sept. 8, 1970   O. J. MARTIN   3,528,089
CONDITION RESPONSIVE WEIGHING APPARATUS
Filed March 18, 1968   4 Sheets-Sheet 3
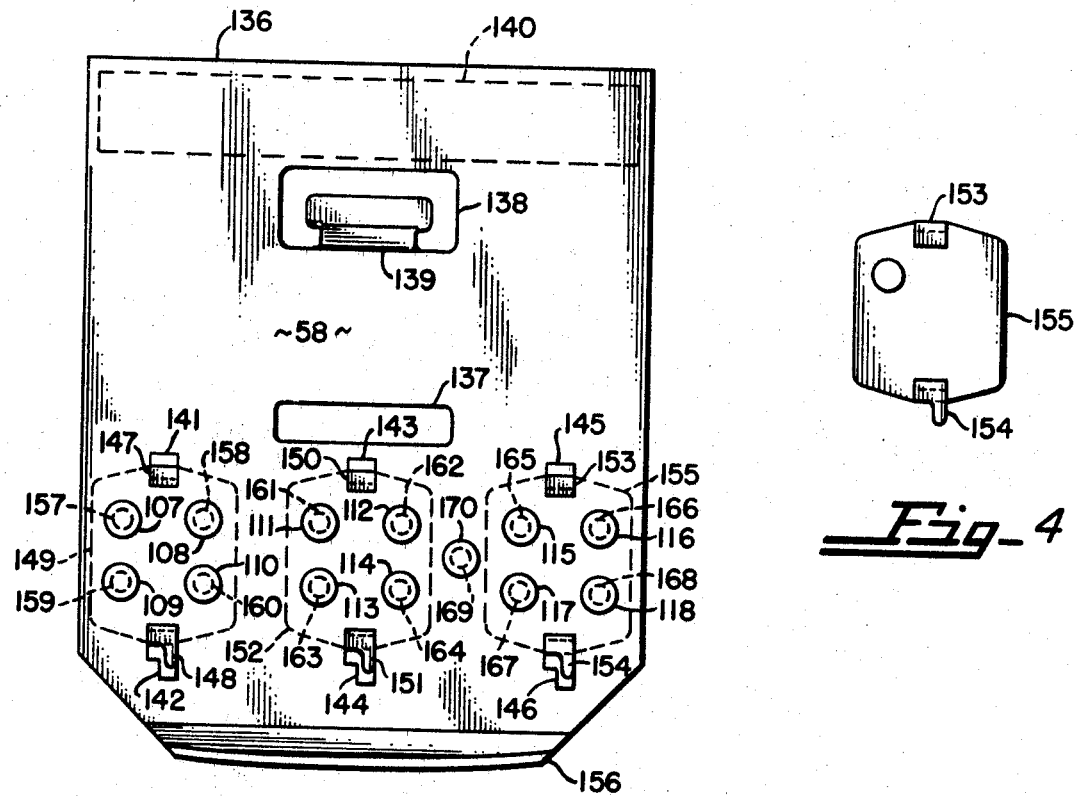
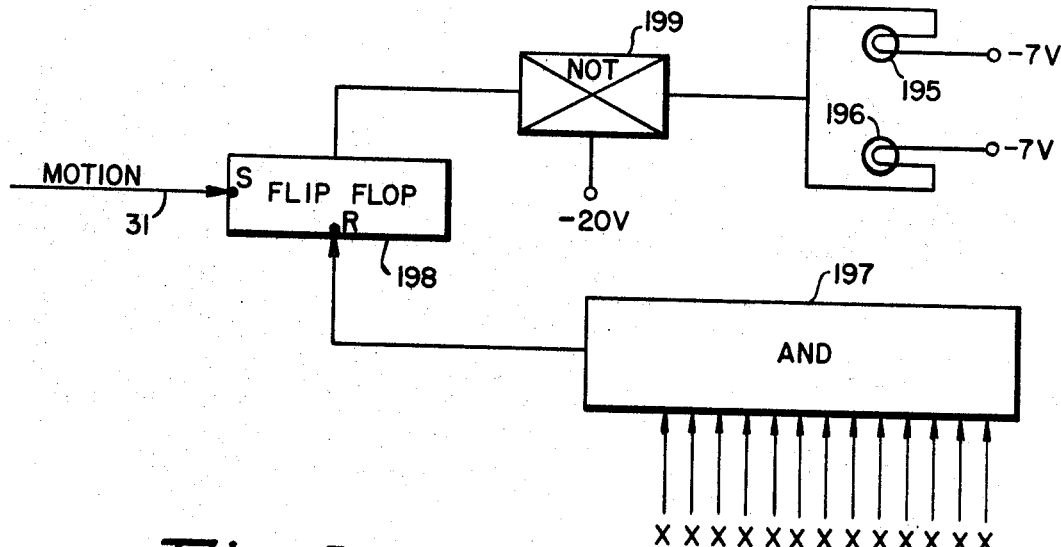
INVENTOR.
ORVAL J. MARTIN
BY
Thomas H. Grafton
ATTORNEY

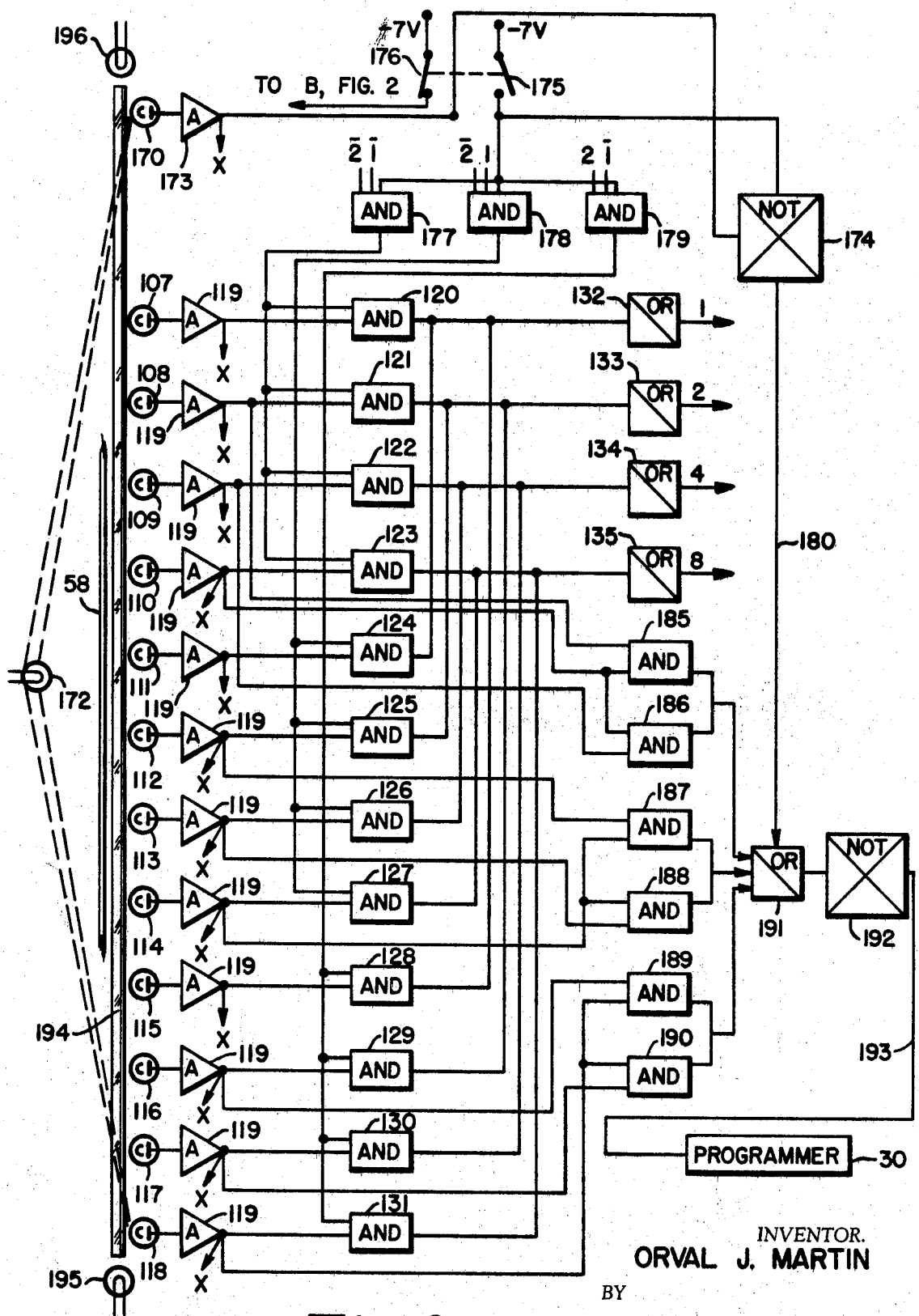

United States Patent Office 3,528,089
Patented Sept. 8, 1970

3,528,089
CONDITION RESPONSIVE WEIGHING APPARATUS
Orval J. Martin, Toledo, Ohio, assignor to The Reliance Electric and Engineering Company, Toledo, Ohio, a corporation of Ohio
Filed Mar. 18, 1968, Ser. No. 713,833
Int. Cl. G01g 23/38
U.S. Cl. 177—3      9 Claims

ABSTRACT OF THE DISCLOSURE

A computing weighing scale comprising phootsensitive means for setting up selected price factors in the scale's computer and interlock means for preventing initiation or completion of the system's operating cycle, which includes weighing, computing, and printing, if part of the photosensitive means burns out.

BACKGROUND OF THE INVENTION

Field of the invention

The invention relates to electrical or electronic computing weighing scales which compute the values of packages of goods according to the weights of the packages and arbitrarily selected unit price factors and print tickets, labels or the like bearing such computed values and selected prices together with net weights, dates, store codes, commodity names, and commodity grades.

Description of the prior art

U.S. application Ser. No. 535,760, filed Mar. 21, 1966 in the name of William C. Susor discloses a computing weighing scale in which selected unit price factors are entered into the scale's computer either by manually operated selector switches or by photosensitive means. A shorted photocell in the photosensitive means produces an incorrect unit price input to the computer and an interlock is disclosed which detects attempts to enter excess unit price.

SUMMARY OF THE INVENTION

Specifically, the invention envisions an interlock for preventing initiation or completion of the system's operating cycle, which includes weighing, computing and printing, if one or more of the photocells burns out.

The objects of this invention are to improve compuitng weighing scales, to improve the techniques of setting up selected price factors in the computers of such scales, and to provide an interlock guarding against improper operation in such scales in the event that photosensitive means setting up such selected price factors burns out partially or completely.

BRIEF DESCRIPTION OF THE DRAWINGS

FIG. 3 is a plan view of a commodity name printing plate defining openings with masks covering selected openings in a pattern according to a selected price factor and in combination with photocells which are operated by the plate in accordance with the pattern;

FIG. 4 is a plan view of one of the masks shown in FIG. 3;

FIG. 5 is a block diagram of an interlock circuit for preventing initiation or completion of the system's operating cycle if part of the photosensitive means burns out; and FIG. 6 is a block diagram showing how the photocells illustrated in FIG. 3 are in circuit with the computer and the programmer shown in FIG. 1.

DESCRIPTION OF THE PREFERRED EMBODIMENT

Figure 1:
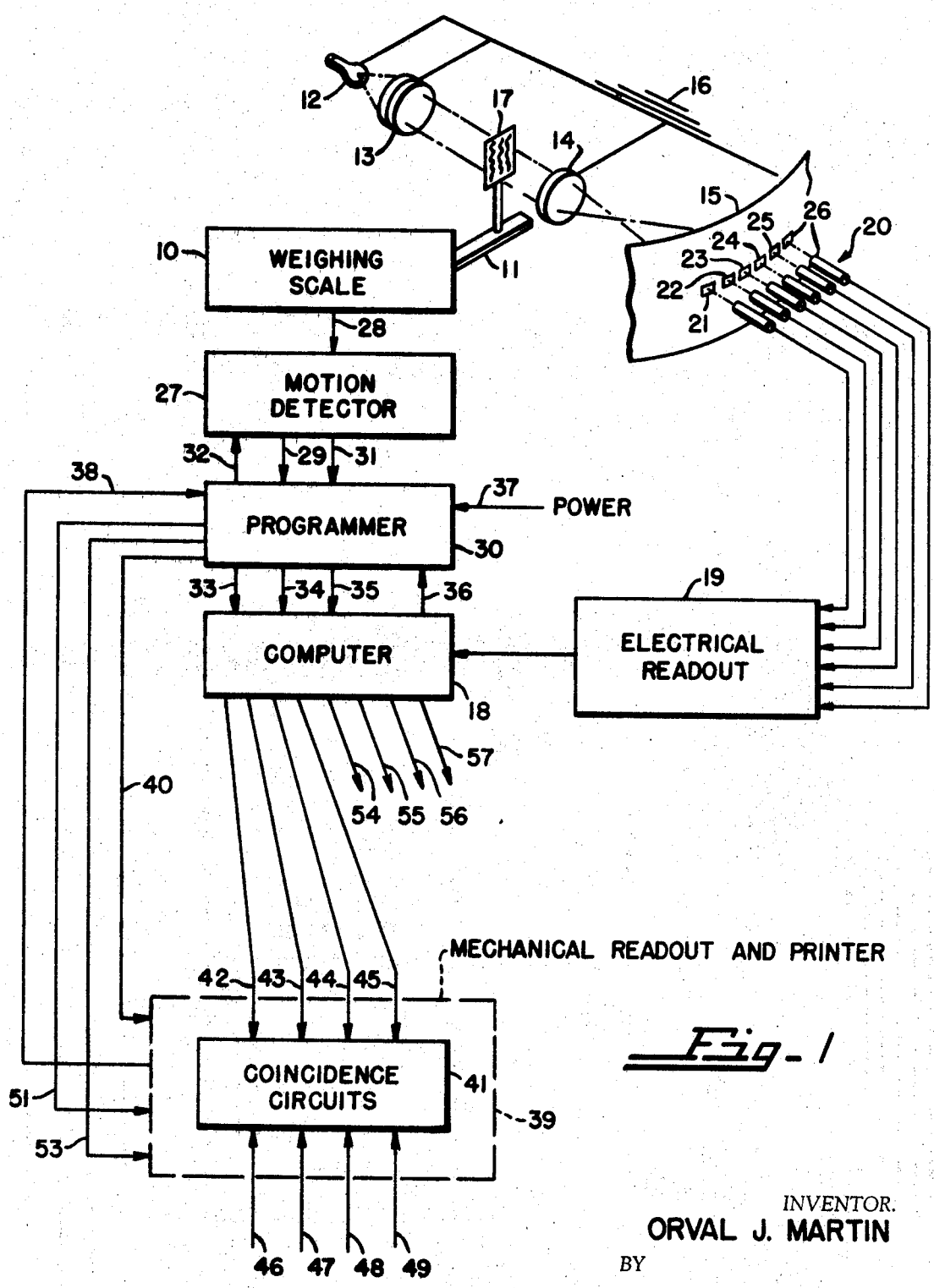
FIG. 1 is a schematic diagram illustrating the general organization of an electrical weighing, computing and printing system with photosensitive means for setting up selected unit price factors in the computer combined therewith.

Referring to FIG. 1, a computing weighing scale 10 includes a lever 11 and an optical projection system which diagrammatically includes a light source 12, a condensing lens 13, a projection lens 14 and a photocell mask 15. The light source 12, the lenses 13 and 14, and the mask 15 are connected to ground as shown at 16 (e.g., base of weighing scale), the mask 15 being rigidly mounted with respect to the projection optics. A coded chart 17 is moved by the load-responsive lever 11 in the optical projection system, the chart 17, hence, being condition responsive. The computer 18 which is disclosed in the U.S. application Ser. No. 439,751, filed Mar. 15, 1965 in the name of William C. Susor receives weight information from the scale and multiplies the weight of an article upon the scale by the unit price of such article to compute the value of such article. The computer 18 also multiplies such unit price times one so that it can produce a unit price output. The computer 18 has a weight input which is compatible with the parallel 1–2–4–8 binary coded decimal output of an electrical readout 19 in circuit therewith.

The chart 17 has a matrix of coded markings arranged in vertical bands so that the relative position thereof may be read by a bank of readout photocells 20, with one cell being associated with each column, providing an indication of the weight upon the scale. The output of the photocells is applied to the electrical readout 19, which makes available weight information to the input of the computer 18. The mask 15 is shown as being slitted at 21–26 so that a small and clearly defined portion of the projected image of the chart 17 is permitted to fall on each of the sensitive grids of the photocells, i.e., the mask screens out unwanted chart bits (the projection lens 14 projects all of the bits in its field of view). There is a total of fourteen photocells in the photocell bank 20, only six of the fourteen photocells being shown for the sake of simplicity. Fourteen photocells are enough to read out a chart capacity of 25.00 pounds.

The weighing scale 10 is connected operatively to a motion detector 27 through a connection 28 which prevents erroneous weight readouts from taking place when the weighing mechanism is in motion. The motion detector 27 applies no motion signals through a lead 29 to a programmer 30 which is disclosed in U.S. application Ser. No. 429,230, filed Feb. 1, 1965 in the names of W. C. Susor and O. J. Martin. The motion detector 27 also applies motion signals through a lead 31 to the programmer 30 and receives conditioning signals from the programmer 30 through a lead 32.

The programmer 30 applies reset signals and command to compute signals through leads 33, 34 and 35, respectively, to the computer 18 and receives program advance signals through a lead 36 form the computer 18. The programmer 30 also receives power on signals through a lead 37 and coincidence check signals through a lead 38. The coincidence check signals indicate that the computer 18 and the read out positions of the number wheels in a mechanical readout and printer 39 agree. The programmer 30 also applies a signal through a lead 40 to the mechanical readout and printer 39 commanding it to print.

The programmer 30 is used in conjunction with a mechanical readout which is disclosed in U.S. application Ser. No. 416,526, filed Dec. 7, 1964 in the name of C. E. Adler. The readout includes a combination of a series of modules each comprising a detent wheel which is directly gear connected to a commutator and to a print wheel. Each module indicates the digits of a particular denominational order. When the turning print wheel approaches the correct indicating position, a stopping latch intercepts the correct one of the teeth of the detent wheel to arrest the detent wheel. Such readout also includes coincidence circuits 41 which receive 1-2-4-8 binary coded unit price signals from the computer 18 through leads 42-45 and 1-2-4-8 binary coded decimal signals through leads 46-49 indicative of the positions of the commutators. The detent wheels and thus the print wheels are stopped when the coincidence circuits determine that the wheels are in the correct indicating positions. The readout also includes a solenoid which when it receives a signal through a lead 51 permits a new reading to be made and a solenoid which when it receives a signal through a lead 53 unlocks the unit price indicating modules which otherwise remain locked to accomplish repeat printing without recycling such unit price indicating modules. Similarly, the coincidence circuits 41 receive 1-2-4-8 binary coded decimal value signals from the computer 18 through leads 54-57 and 1-2-4-8 binary coded decimal signals through leads not shown indicative of the positions of the commutators.

Although the various logic circuits mentioned herein are in common use in the electronic control field, a brief description of the function of each circuit is as follows. An AND logic circuit produces an output signal when, and only when, all of a plurality of input signals are present. A NOT logic circuit produces an output signal at all times unless an input signal is present. A MEMORY logic circuit sometimes known as a flip flop or bistable circuit has "ON" and "OFF" or reset input terminals, and "ON" and "OFF" output terminals. The MEMORY or bistable circuit produces an "ON" output signal in response to a signal applied at the "ON" input terminal and continues to produce the "ON" output signal, even though the input signal at the "ON" input terminal is removed, until a signal is applied to the "OFF" input terminal. The MEMORY circuit will then be turned "OFF" and produce an "OFF" output signal even though the signal at the "OFF" input terminal is removed. The MEMORY circuit will revert to its initial state upon application of a signal to the "ON" input terminal. An OR logic circuit produces an output upon receiving an input signal at any of a plurality of input terminals. For further details on the construction and operation of various types of logic circuits reference is made to an article entitled "Static Switching Devices," by Robert A. Mathias, in Control Engineering, May 1957. All of the logic circuits mentioned hereinafter are of conventional type.

The mechanical readout is used in conjunction with a printer which is disclosed in U.S. Pat. No. 3,334,583, issued August 8, 1967 in the name of Calrence E. Adler. The printer includes a commodity name printing plate which is similar in its printing function to the printing plate 58.

The computer 18 includes a price entry section 59 (FIG. 2) having a two-stage flip flop 61 which counts to three by the following code:

| 1 | 2 | 4 | 8 | Count | Binary output |
|---|---|---|---|-------|---------------|
| 0 | 0 | 0 | 0 | 0 | $\bar{1}\bar{2}$ -- not 1, not 2. |
| 1 | 0 | 0 | 0 | 1 | $1\bar{2}$ -- true 1, not 2. |
| 0 | 1 | 0 | 0 | 2 | $\bar{1}2$ -- not 1, true 2. |
| 1 | 1 | 0 | 0 | 3 | $12$ -- true 1, true 2. |

The price entry section or circuit 59 has a capacity of $9.99. The least significant place in the selected price per pound is multiplied by each place in the weight figure using the least significant place first, etc. The price entry circuit includes a bank of nine cents contacts 101, a bank of nine dimes contacts 102, and a bank of nine dollars contacts 103 which are closed by setting price knobs or levers to selected positions. The contacts are in circuit with the respective ones of terminals 1-9 in a diode matrix 73. The AND gate 83 when enabled by the two-stage flip flop 61 being in its reset state applies an output to a lead 104 (controls partial product gating not shown) and to an AND gate 83a having its output connected to the bank of cents contacts 101; the AND gate 84 when enabled by the two-stage flip flop 61 being in its count one state applies an output to a lead 105 (controls partial product gating not shown) and to an AND gate 84a having its output connected to the banck of dimes contacts 102; and the AND gate 85 when enabled by the two-stage flip flop 61 being in its count two state applies an output to a lead 106 (controls partial product gating not shown) and to an AND gate 85a having its output connected to the bank of dollars contacts 103.

The decimal price entry, e.g., a price of $1.12, would connect a closed contact in the bank 101 to the "2" terminal of the diode matrix 73, a closed contact in the bank 102 to the "1" terminal of the diode matrix 73, and a closed contact in the bank 103 to the "1" terminal of the diode matrix 73, is changed to 1-2-4-8 binary coded decimal by the diode matrix 73. Only one bank of contacts is energized at a time as programmed by the two-stage flip flop 61. When price contacts are closed, output terminals "1," "2," "4" and "8" of the diode matrix 73 apply binary coded decimal inputs to the rest of the computer as shown in the above U.S. application Ser. No. 439,751. Zero places in the price entry are entered by opening all of the contacts in the respective contact banks 101-103.

The computer 18 which is disclosed in the above U.S. application Ser. No. 439,751 is modified to have the selected price factors entered into the computer either by the manually operated selector switches 101-103 in a first mode of operation or by photosensitive means in a second mode of operation. This modification requires the addition of AND gates 83a-85a which are controlled by the AND gates 83-85, respectively. The photosensitive means includes four cents photocells 107-110, four dimes photocells 111-114 and four dollars photocells 115-118. Amplifiers 119 apply the amplified photocell outputs to AND gates 120-131, respectively. The outputs of AND gates 120, 124 and 128 are applied to an OR gate 132; the outputs of AND gates 121, 125 and 129 are applied to an OR gate 133; the outputs of AND gates 122, 126 and 130 are applied to an OR gate 134; and the outputs of AND gates 123, 127 and 131 are applied to an OR gate 135. The outputs of the OR gates 132-135 are applied to the output terminals "1," "2," "4" and "8," respectively, of the diode matrix 73 (FIG. 2) for the application of binary coded decimal price entry inputs to the rest of the computer.

The commodity name printing plate 58 includes a flat body 136 defining an opening 137 and an opening 138 at which a tab 139 is located which is bent up as viewed in FIG. 3 out of the plane of the flat body 136, and carries printing type 140 for printing the commodity name. The flat body 136 also defines two holes 141 and 142 for the reception of legs 147 and 148, respectively, of a cents mask 149, two holes 143 and 144 for the reception of legs 150 and 151, respectively, of a dimes mask 152, and two holes 145 and 146 for the reception of legs 153 and 154, respectively, of a dollars mask 155, and has a handle 156 bent out of its plane. The flat body 136 also defines four cents holes 157-160, four dimes holes 161-164, and four dollars holes 165-168. Photocells 107-118 look at holes 157-168, respectively. The flat body 136 also defines an interlock hole 169. An interlock photocell 170 looks at the hole 169.

The commodity name printing plate 58 except for the holes 141–146 and 157–168 is like the printing plate disclosed in the above U.S. Pat. No. 3,334,583 and is secured in the printer disclosed in such patent in the same manner as the prior printing plate is secured in the printer, i.e., by means of two magnets shown in such patent, the hole 137 in the printing plate 58 receiving a finger projecting from the printer and the tab 139 on the printing plate 58 being received in a hole in the printer as an aid in locating the printing plate and keeping it stable. Both printing plates function to print the name of the commodity. The magnets (magnets 166 in FIG. 9 of U.S. Pat. No. 3,334,583) are spaced apart and between them in the area shown in FIG. 9 of the patent above the block 161 as viewed in such FIG. 9 are located the fourteen photocells 107–118 and 170–171 in the arrangement shown in FIG. 3. The printing plate 58 is held by the magnets closely juxtaposed to the photocells, the printing plate 58 being located relative to the photocells as shown in FIG. 3 when it is in operative position in the printer. A light source 172 (FIG. 6) is formed by two light bulbs wired in series which are supported in brackets that are not shown but which are mounted from the bar 179 shown in FIG. 4 in the above U.S. Pat. No. 3,334,583 so that light bulbs are juxtaposed to the ticket deflector 165 shown in such FIG. 4 in the patent. When the printing plate 58 is in operative position and when the pivotable frame 142 shown in the above U.S. Pat. No. 3,334,583 which carries the photocells 107–118 and 170 and the printing plate 58 is in its operative position, the light source 172 illuminates the photocells 107–118 and 170 to activate them through those of the holes 157–169 in the printing plate 58 which are uncovered.

The masks 149, 152 and 155 function to cover selected one of the openings 157–168 in the printing plate 58 in a pattern according to a selected price factor. There are four holes 157–168 for each of the three places in the price and by giving the four holes in each set values of 1-2-4-8, respectively, decimal prices are converted to 1-2-4-8 binary coded decimal values. The legs 147–148, 150–151, and 153–154 of the masks 149, 152, and 155 are spaced apart slightly more than the distance between the holes in the printing plate 58 which receive them so that when they are forced by finger pressure into the holes the masks are held in place. However, the masks can be removed by pulling them away from the printing plate. Holes 142, 144 and 146 and their cooperating mask legs are shaped differently than are the respective holes 141, 143 and 145 and their cooperating legs to ensure proper orientation of the masks. Holes 157–160 correspond, respectively, to 1-2-4-8 binary coded decimal numbers in the cents place and photocells 107–110, accordingly, correspond, respectively, to the 1-2-4-8 binary coded decimal numbers in the cents place; holes 161–164 correspond, respectively, to 1-2-4-8 binary coded decimal numbers in the dimes place and photocells 111–114, accordingly, correspond, respectively, to the 1-2-4-8 binary coded decimal numbers in the dimes place; and holes 165–168 correspond, respectively, to 1-2-4-8 binary coded decimal numbers in the dollars place and photocells 115–118, accordingly, correspond, respectively, to the 1-2-4-8 binary coded decimal numbers in the dollars place. Each of the masks 149, 152 and 155 bears an identifying decimal number (not shown). In order to set up a printing plate 58 to enter a price of $1.27, for example (the price set up depends on the current price per pound of the commodity whose name is to be printed by the printing type 140), the operator clips a "1" mask over holes 165–168 which mask has a hole ("1" mask 155 shown in FIG. 4) exposing the hole 165 to produce a "1" binary coded decimal output, clips a "2" mask over holes 161–164 which mask has a hole exposing the hole 162 to produce a "2" binary coded decimal output, and clips a "7" mask over holes 157–160 which mask has three holes exposing the holes 157–159 to produce a "7" binary coded decimal output.

The amplified output of the interlock photocell 170 is applied by an amplifier 173 to a NOT gate 174. Power is applied to the NOT gate 174 from a −7 volts source through a contact 175. Contact 175 is mechanically connected to a contact 176 which connects a −7 volts source to point "B" in FIG. 2. When contact 175 is open, contact 176 is closed and vice versa. Contact 175 also applies power to AND gates 177–179. The output of the NOT gate 174 is applied through a lead 180 to the input of an OR gate 191.

The mode of operation is selected by the contacts 175–176. When contact 175 is open and contact 176 is closed the scale is in manual mode and when the positions of the contacts 175–176 are reversed the scale is in photosensitive mode.

In manual mode (contact 175 open and contact 176 closed) power is applied at point "B" (FIG. 2) applying power to AND gates 83a–85a. Price switches 101–103 are used to enter the selected price into the computer. As described in the above U.S. application Ser. No. 439,751, the AND gate 83 is enabled by the "$\bar{1}$" and "$\bar{2}$" outputs of the reset flip flop 61 (FIG. 2) enabling in turn the added AND gate 83a to select the cents place in the price per pound to be multiplied first (price entry produces the 1-2-4-8 binary coded decimal output from the diode matrix 73). Then the AND gate 84 is enabled by the "$\bar{2}$" and "1" outputs of the flip-flop 61 enabling in turn the added AND gate 84a to select the dimes place in the price per pound to be multiplied next and then the AND gate 85 is enabled by the "2" and "$\bar{1}$" outputs of the flip flop 61 enabling in turn the added AND gate 85a to select the dollars place in the price per pound to be multiplied next.

In photosensitive mode (contact 175 closed and contact 176 open) power is applied to the NOT gate 174 and to the AND gates 177–179 (FIG. 6). When commodity name printing plate 58 (FIGS. 3 and 6) is in operative position in the printer, the interlock hole 169 exposes the interlock photocell 170 to light from the light source 172. Photocell 170 being light causes it to apply an input through the amplifier 173 to the NOT gate 174. The AND gates 177–179 are enabled by the same respective outputs from the flip flop 61 as are the AND gates 83–85 as indicated at the input leads to the AND gates 177–179 in FIG. 6 to select the places in the price per pound to be multiplied one at a time (partial products). Enabled cents AND gate 177 enables cents AND gates 120–122 (partially enabled by 1-2-4-8 binary coded decimal signals from the photocells 107–110) which apply inputs to the OR gates 132–135 that have their outputs connected to the "1," "2," "4" and "8" output terminals of the diode matrix 73 (FIG. 2) to enter the cents place in the price entry into the computer by photosensitive means controlled by the printing plate 58. This eliminates the chance of operator's mistakes in entering the price through the switches 101–103. Once the supervisor has set up the correct price on the printing plate 58 by clipping on the masks, the action of the operator in putting a "hamburg" printing plate in the printer, for example, sets up the correct "hamburg" price per pound in the computer. Enabled dimes AND gate 178 enables dimes AND gates 124–127 (partially enabled by 1-2-4-8 binary coded decimal signals from the photocells 111–114) which apply inputs to the OR gates 132–135 to enter the dimes place in the price entry into the computer by the photosensitive means. Enabled dollars AND gate 179 enables dollars AND gates 128–131 (partially enabled by 1-2-4-8 binary coded decimal signals from the photocells 115–118) which apply inputs to the OR gates 132–135 to enter the dollars place in the price entry into the computer by the photosensitive means.

The output of a NOT gate 192, which has its input connected to the output of the OR gate 191, is connected to the input of an AND gate in the programmer 30 shown in the above U.S. application Ser. No. 429,230

(AND gate 67 in the application), which has its output connected to the "IN" terminal of the two-stage flip flop 54 shown in the application, through the switches 69, 68, 71 and 207 shown in the application (AND gate 67, flip flop 54, switches 69, 68, 71 and 207 are part of the programmer 30 FIGS. 1 and 6). As described in such U.S. application Ser. No. 429,230, an interruption of the signal applied through the switches to the AND gate 67 shown in the application prevents advance of the programmer 30 or interrupts the program by resetting the programmer 30. Similarly, since the output of the NOT gate 192 (FIG. 6) is applied through a lead 193 as an input to the programmer 30 through the above existing circuitry, a plus input to the NOT gate 192 (plus input to NOT gate 192 results in an inverted, i.e., minus output) prevents advance of the programmer 30 or interrupts the program by resetting the programmer 30; this in turn prevents printing by preventing or interrupting computing.

Failure of the light source 172 when the plate 58 is in the printer causes the interlock photocell 170 to go dark cutting off the input to the NOT gate 174. Burning out of the photocell 170 has the same effect. The inverted plus output from the NOT gate 174 is applied as an input to the OR gate 191 which in turn applies its plus input to the NOT gate 192. The inverted minus output from the NOT gate 192 to the programmer 30 prevents advance of the programmer if the program has not begun or interrupts the program by resetting the programmer.

Figure 2:
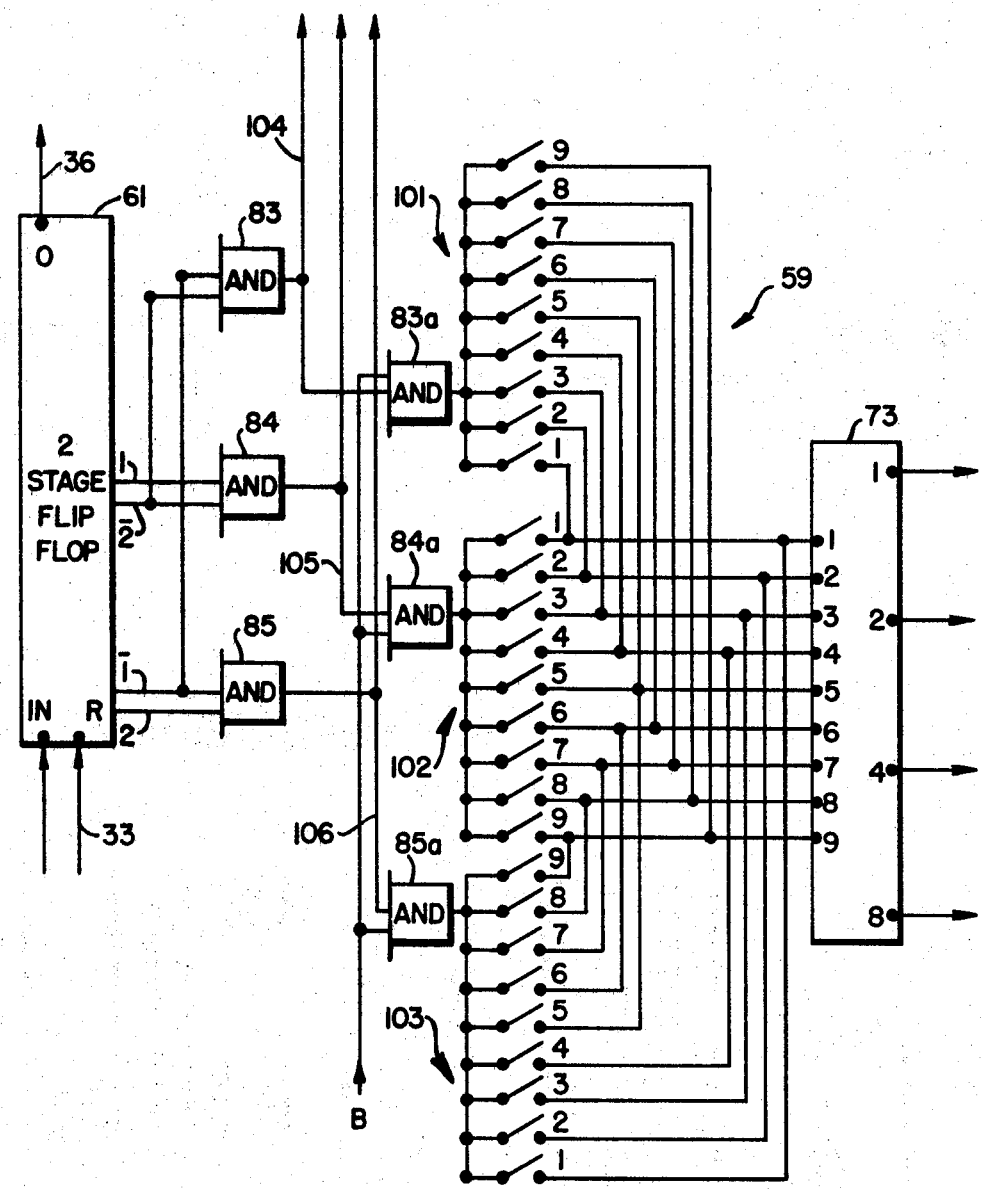
FIG. 2 is a diagram of part of the computer shown in FIG. 1 illustrating the price factor entry section of the computer.

The capacity of the computer 18 to accept a price entry is $9.99 which is the capacity of the switches 101–103 (FIG. 2). However, a short in one of the price entering photocells might result in an attempt to enter a place in the selected price factor in excess of nine. As a protection against such an excess price entry, AND gates 185–190, OR gate 191, and NOT gate 192 are provided. The AND gate 185 receives the 2–8 binary coded decimal outputs (decimal 10) from the cents photocell 108 and 110 and the AND gate 186 also receives such 8 output from the photocell 110 and receives the 4 binary coded decimal output (decimal 12) from the cents photocell 109. Accordingly, any attempt to enter a number ten or larger in the cents place results in enabling AND gate 185 or 186. Similarly, AND gates 187 and 188 receive 2–8 and 8–4 binary coded decimal outputs from the respective dimes photocells and AND gates 189 and 190 receive 2–8 and 8–4 binary coded decimal outputs from the respective dollars photocells. Accordingly, any attempt to enter a number ten or larger in the dimes or dollars place results in enabling the respective AND gates 187–190. The enabling of any one of the AND gates 185–190 results in an input signal to the OR gate 191 whose plus output signal is inverted to a minus signal by the NOT gate 192 and applied through the lead 193 to the programmer 30. As described above, advance of the programmer 30 then is prevented or the program of the programmer 30 is interrupted, i.e., the interlock prevents or interrupts computing if the photosensitive means attempts to set up a place in the selected price factor in excess of a predetermined number. This interlock is disclosed in the above U.S. application Ser. No. 535,760.

The above excess price interlock does not work in some instances. For example, if the desired price entry is $1.00 and the "8" photocell 118 is shorted, the "1" photocell 115 and the "8" photocell 118 enter $9.00 into the computer with no detection of the mistake by the excess price interlock. However, if the desired price entry is $2.00 and the "8" photocell 118 is shorted, the "2" photocell 116 and the "8" photocell 118 will attempt to enter $10.00 into the computer but, as described above, a 2–8 input to AND gate 189 prevents advance or interrupts the program of the programmer 30. The prior excess price interlock cannot detect burned out photocells at all. For example, if the desired price entry is $8.00 and the "8" photocell 118 is burned out, zero price will be entered into the comuputer. It has been found by experience in the field that the photocells never short out but in rare insances shorts occur in the wiring. Undetected shorts, i.e., undetected by the interlock, usually are obvious to the operator by inspecting the printed labels because, e.g., if "8" photocell 118 is shorted, an eight in the dollars place will be entered even though the operator has set $0.59 as a price entry. However, as mentioned above, the problem of shorts is so unusual that the problem has turned out not to exist as a practicable matter. The real problem is detecting not shorts but burned out photocells.

The interlock of the invention prevents initiation or completion of the system's operating cycle, which includes the above weighing, computing and printing sub-cycles, if a photocell fails to provide a light output, i.e., each photocell has dark and light outputs, the light output being produced when it is illuminated by the light source 172.

A "Lucite" plastic plate or light pipe 194 (FIG. 6) is carried by the above printer pivotable frame (frame 142 in U.S. Pat. No. 3,334,583) juxtaposed to the photocells 107–118 and 170 and two light bulbs 195 and 196 also are carried by the printer pivotable frame juxtaposed to the ends of the plastic plate 194 so that the plastic plate conveys the light from one of the light bulbs 195 to illuminate one-half of the photocells 107–118 and 170 and conveys the light from the other one of the light bulbs 196 to illuminate the other one-half of the photocells 107–118 and 170. Printing is prevented by preventing or interrupting computing when one or more of the photocells fails or when one of the lamps 195 or 196 fails. The plastic plate 194 is located between the printing plate 58 and the photocells so that the printing plate cannot mask the photocells from the lamps 195 and 196.

An AND gate 197 has thirteen inputs one from each of the photocell amplifiers 119 and 173 (X's in FIG. 6 connected to X's in FIG. 5) and has its output connected to reset terminal R of a flip flop 198. A motion signal on the lead 31 (FIGS. 1 and 5) applied to the set terminal S of the flip flop 198 sets the flip flop. The set flip flop 198 turns a NOT gate 199 on which in turn turns on the lamps 195 and 196 which then are connected between −7 volts and −20 volts as shown in FIG. 5. Since the lamps 195 and 196 are on, the plastic plate 194 illuminates the thirteen photocells 107–118 and 170.

If all thirteen photocells are on, the output from the AND gate 197 resets the flip flop 198 and nothing happens. Every motion signal on the lead 31 triggers this automatic check.

If one or more of the thirteen photocells is burned out or if one of the lamps 195 and 196 is burned out, one or more of the inputs to the AND gate 197 is absent resulting in the set flip flop 198 maintaining at least one of the lamps 195 and 196 energized. One burned out photocell results in an output from the OR gate 191 because the lamps 195 and 196 continue to illuminate the good photocells. As described above, outputs from the 2–8 and 8–4 photocells in each price place enable the AND gates 185–190 which in turn produce inputs to the OR gate 191. As also described above, an input to the OR gate 191 results in the program of the programmer 30 being interrupted or prevented from advancing if the program has not yet started. One burned out lamp 195 or 196 also results in an output from the OR gate 191 because the good lamp continues to illuminate one-half of the photocells which causes one or more of the AND gates 185–190 to be enabled enabling in turn the OR gate 191.

The photocells 107–118 and 170 have outputs whether or not they are illuminated but these outputs are at different voltage levels. The light outputs set price into the computer (however, the dark outputs could be so used provided a change is made in the circuit), the interlock means preventing improper operation if one or more of the photocells fails to provide said light output, i.e., one or more of the photocells is burned out.

It is to be understood that the above description is il-

Having described the invention, I claim:

1. A computing weighing scale having an operating cycle comprising, in combination, motion detecting means for initiating the cycle when no motion of the scale is detected, a computer for computing the value of a commodity according to its weight factor and a selected price factor, means for setting up the weight factor in the computer, photosensitive means having dark and light outputs for setting up the selected price factor in the computer by means of one of the outputs, light source means for illuminating the photosensitive means, the illuminated photosensitive means providing said light output, and interlock means for preventing initiation or completion of said cycle if the photosensitive means fails to provide said light output, the interlock means including second light source means for illuminating the photosensitive means to produce the light output and circuit means, operated by the motion detecting means when the motion detecting means detects motion, for energizing the second light source means.

2. A computing weighing scale having an operating cycle comprising, in combination, a computer for computing the value of a commodity according to its weight factor and a selected price factor, means for setting up the weight factor in the computer, photosensitive means having dark and light outputs for setting up the selected price factor in the computer by means of one of the outputs, light source means for illuminating the photosensitive means, the illuminated photosensitive means providing said light output, and interlock means for preventing initiation or completion of said cycle if the photosensitive means fails to provide said light output, the interlock means including second light source means for illuminating the photosensitive means to produce the light output and circuit means for energizing the second light source means, the circuit means comprising an AND gate having inputs in circuit with the photosensitive means and an output in circuit with the second light source means for turning off the second light source means in the absence of burned-out photosensitive means.

3. A computing weighing scale having an operating cycle comprising, in combination, a computer for computing the value of a commodity according to its weight factor and a selected price factor, means for setting up the weight factor in the computer, photosensitive means having dark and light outputs for setting up the selected price factor in the computer by means of one of the outputs, light source means for illuminating the photosensitive means, the illuminated photosensitive means providing said light output, and interlock means for preventing initiation or completion of said cycle if the photosensitive means fails to provide said light output, the interlock means including second light source means for illuminating the photosensitive means to produce the light output and circuit means for energizing the second light source means momentarily in the absence of burned-out photosensitive means.

4. A computing weighing scale having an operating cycle comprising, in combination, a computer for computing the value of a commodity according to its weight factor and a selected price factor, means for setting up the weight factor in the computer, photosensitive means having dark and light outputs for setting up the selected price factor in the computer by means of one of the outputs, light source means for illuminating the photosensitive means, the illuminated photosensitive means providing said light output, and interlock means for preventing initiation or completion of said cycle if the photosensitive means fails to provide said light output, the interlock means including second light source means for illuminating the photosensitive means and circuit means, operable momentarily prior to setting up the selected price factor in the computer, for energizing the second light source means.

5. A computing weighing scale according to claim 4 wherein the interlock means functions additionally to prevent initiation or completion of said cycle if the second light source means fails.

6. A computing weighing scale having an operating cycle comprising, in combination, a computer for computing the value of a commodity according to its weight factor and a selected price factor, means for setting up the weight factor in the computer, photosensitive means having dark and light outputs for setting up the selected price factor in the computer by means of one of the outputs, light source means for illuminating the photosensitive means, the illuminated photosensitive means providing said light output, a printing plate defining openings, means for covering selected openings in a pattern according to the selected price factor, the printing plate masking the photosensitive means from the light source according to the pattern to operate the photosensitive means and also printing the commodity name, and interlock means for preventing initiation or completion of said cycle if the photosensitive means fails to provide said light output, the interlock means including second light source means so positioned to illuminate the photosensitive means that the printing plate cannot mask the photosensitive means from the second light source means.

7. A computing weighing scale according to claim 6 wherein the interlock means further includes light pipe means for conveying light from the second light source means to the photosensitive means.

8. A computing weighing scale according to claim 6 wherein the interlock means further includes means for energizing the second light source means intermittently.

9. A computing weighing scale according to claim 6 wherein the interlock means also functions to prevent initiation or completion of said cycle if the second light source means fails.

References Cited
UNITED STATES PATENTS

| | | | |
|---|---|---|---|
| 3,145,792 | 8/1964 | Bell | 177—4 |
| 3,163,247 | 12/1964 | Bell et al. | 177—3 |
| 3,408,482 | 10/1968 | Busby. | |
| 3,440,409 | 4/1965 | Kaminsky et al. | |
| 3,459,272 | 3/1966 | Susor | 177—4 |

ROBERT S. WARD, JR., Primary Examiner

G. H. MILLER, JR., Assistant Examiner

U.S. Cl. X.R.
177—25; 235—61